US009623761B2

(12) United States Patent
Gale et al.

(10) Patent No.: US 9,623,761 B2
(45) Date of Patent: Apr. 18, 2017

(54) VEHICLE AND METHOD FOR AUTHENTICATING A CHARGE STATION

(75) Inventors: Allan Roy Gale, Livonia, MI (US); Paul Theodore Momcilovich, Tecumseh, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1561 days.

(21) Appl. No.: 12/975,926

(22) Filed: Dec. 22, 2010

(65) Prior Publication Data

US 2012/0161925 A1 Jun. 28, 2012

(51) Int. Cl.
- *G05B 19/00* (2006.01)
- *B60L 11/18* (2006.01)
- *B60L 3/00* (2006.01)
- *B60L 3/04* (2006.01)
- *H02J 7/00* (2006.01)

(52) U.S. Cl.
CPC ......... *B60L 11/1838* (2013.01); *B60L 3/0046* (2013.01); *B60L 3/04* (2013.01); *B60L 11/1816* (2013.01); *B60L 11/1846* (2013.01); *H02J 7/0004* (2013.01); *H02J 7/0027* (2013.01); *B60L 2210/30* (2013.01); *B60L 2240/547* (2013.01); *B60L 2240/549* (2013.01); *B60L 2240/80* (2013.01); *Y02T 10/7005* (2013.01); *Y02T 10/7055* (2013.01); *Y02T 10/7072* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
None
See application file for complete search history.

(56) References Cited

U.S. PATENT DOCUMENTS

| 5,596,258 | A  | * | 1/1997  | Kimura et al.  | 320/163 |
| 5,596,261 | A  | * | 1/1997  | Suyama         | 320/152 |
| 5,598,084 | A  |   | 1/1997  | Keith          |         |
| 5,686,812 | A  | * | 11/1997 | Hotta          | 320/134 |
| 6,930,403 | B2 |   | 8/2005  | Hartman et al. |         |
| 2008/0136371 | A1 | | 6/2008  | Sutardja       |         |
| 2009/0263999 | A1 | | 10/2009 | Onoue          |         |
| 2010/0026237 | A1 | | 2/2010  | Ichikawa et al.|         |
| 2011/0127956 | A1 | * | 6/2011  | Mitsutani     | 320/109 |
| 2011/0254505 | A1 | * | 10/2011 | Evander et al.| 320/109 |
| 2012/0013301 | A1 | * | 1/2012  | Gaul et al.   | 320/109 |
| 2012/0169282 | A1 | * | 7/2012  | Helnerus et al.| 320/109 |

* cited by examiner

*Primary Examiner* — Curtis King
(74) *Attorney, Agent, or Firm* — David B. Kelley; Brooks Kushman P.C.

(57) ABSTRACT

A vehicle may include a battery that receives energy from a charge station remote from the vehicle, and a controller. The controller may request that the station provide information about an electrical parameter associated with energy being supplied by the station, may determine information about an electrical parameter associated with energy received by the battery, and may prevent the battery from further receiving energy if the provided information is different than the determined information.

13 Claims, 3 Drawing Sheets

VEHICLE AND METHOD FOR AUTHENTICATING A CHARGE STATION

STATEMENT REGARDING FEDERALLY SPONSORED RESEARCH OR DEVELOPMENT

The invention was made with Government support under Contract No. DE-FC26-08NT04384. The Government has certain rights to the invention.

BACKGROUND

A battery electric vehicle or plug-in hybrid electric vehicle may receive energy for battery charging from a commercial charge facility. The charge facility may include several charge stations from which energy may be received.

SUMMARY

A method for authenticating a charge station may include establishing communications with the charge station, requesting that the station supply energy at a specified power, voltage or current to a vehicle, and determining a power, voltage or current of energy received by the vehicle. The method may also include preventing the vehicle from further receiving energy from the station if the determined power, voltage or current is not approximately equal to the specified power, voltage or current.

DETAILED DESCRIPTION

Electrified vehicles are now contemplated for widespread use. Connection standards are actively being developed such as J1772(c). This standard establishes a method of communication between a charge station and vehicle charger to communicate, inter alia, the current limit of the charge station. Other techniques may be used, such as digital and/or wireless communication, to communicate information such as charge station voltage and time varying power limits. With the information provided, the vehicle charger can then pull current up to the limit of the charge station.

It is anticipated that there may occur situations where a specific vehicle and charger will find it necessary to confirm that they are indeed transferring power between each other and not a third party. It is also anticipated that charge stations will monitor the actual amount of current, power and energy drawn by the charger for billing and other purposes. This monitoring may provide information on the amount of power, energy, etc. being supplied by the charge station. At the same time, the vehicle charger may also monitor the power, energy, etc. being drawn from the charge station. Considering electrical losses, system resolution and accuracy, the charge station and charger, if connected to each other, should record the same power, energy, etc. during the same intervals of time. These values can be used to confirm that a specific power station and vehicle are indeed connected together.

In cases where the charger is part of the charge station, the traction battery may monitor its current, power, etc. This information can similarly be compared with the off-board charger and charge station to confirm that the charge station and vehicle are indeed connected together.

Communications may be established between an electrical charging station and an electrified vehicle prior to commencement of battery charging. Known/suitable wired (e.g., power line communication) or wireless (e.g., Wi-Fi) technologies may be used to facility such communications. Due to their proximity and other factors, several charging stations may establish communications with a single vehicle. It may therefore be desirable for the vehicle to confirm from which of the charging stations it will be receiving charge energy.

Figure 1:
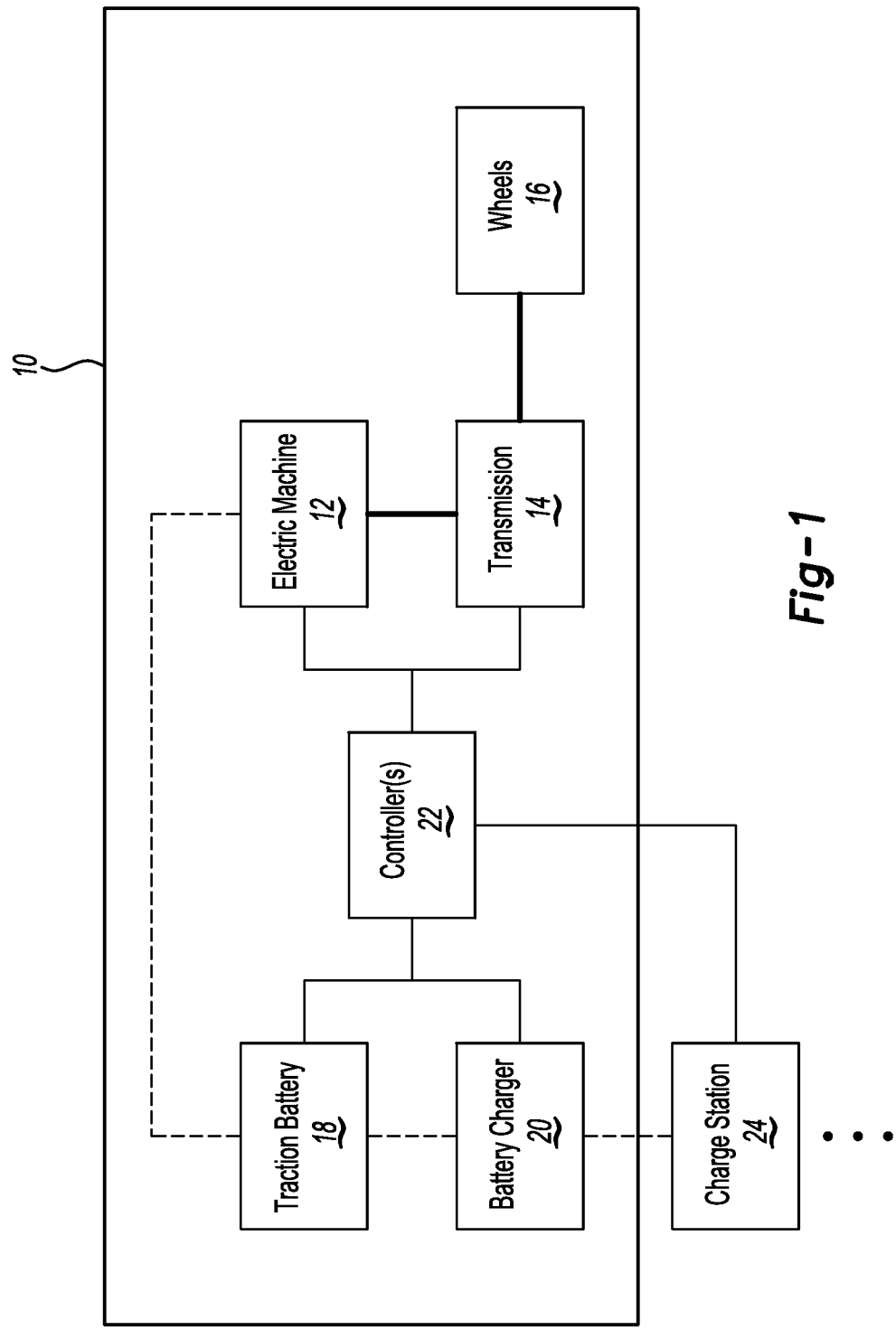
FIG. 1 is a block diagram of an automotive vehicle and charging station.

Referring to FIG. 1, an alternatively powered vehicle 10 may include an electric machine 12, transmission 14 and wheels 16. The vehicle 10 may also include a traction battery 18, battery charger 20 and one or more controller(s) 22. (In other arrangements, the battery charger 20 may be located off of the vehicle 10, such as within a charge station 24.) As known in the art, the electric machine 12 is configured to transform electrical power received from the traction battery 18 into mechanical power to drive the transmission 14 and wheels 16. The electric machine 12 may also be configured to transform mechanical power received from the transmission 14 into electrical power for storage by the traction battery 18.

The traction battery 18 may receive charge power from the battery charger 20 (as indicated by dashed line). As discussed in more detail below, the battery charger 20 may receive charge power from the charge station 24 remote from the vehicle 10 (as indicated by dashed line). As also discussed below in more detail, the electric machine 12, transmission 14, traction battery 18 and battery charger 20 are in communication with/under the control of the controller(s) 22 (as indicated by thin line).

When in the vicinity of the charge station 24, a communication link may be established between the controllers(s) 22 and the charge station 24 (as indicated by thin line). As mentioned above, this communication link may be facilitated by known/suitable wired or wireless technology. In the case of wired technology for example, power line communication modules may be present within the controllers(s) 22 and/or charge station 24. Hence, any electrical connection between the battery charger 20 and charge station 24 may also serve as the signal carrying medium for communications. In the case of wireless technology for example, wireless transceivers may be present within the controllers(s) 22 and/or charge station 24. In certain situations, more than one charge station 24 may be in the vicinity of and in communication with the controllers(s) 22.

Figure 2:
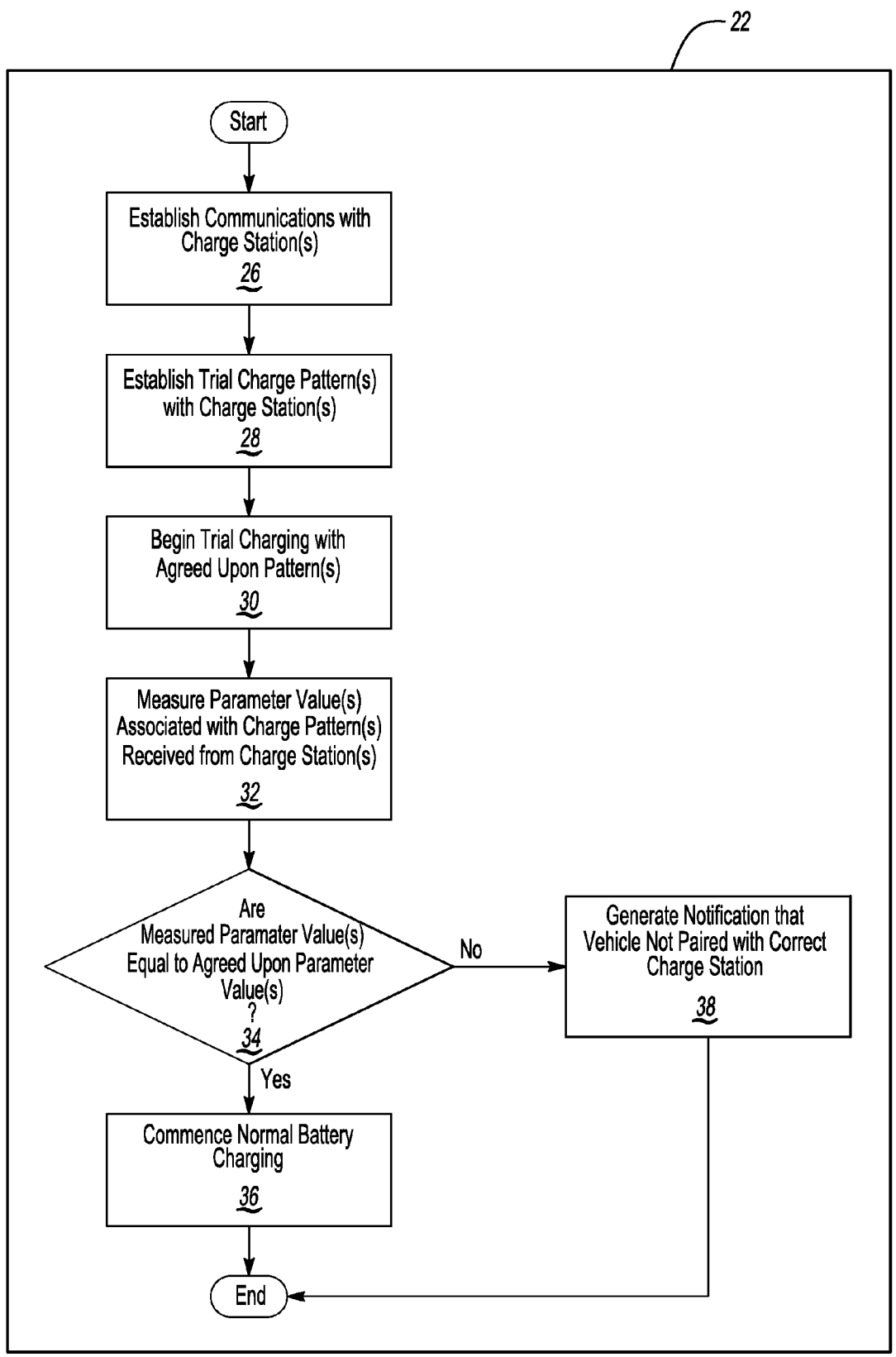
FIG. 2 is a flow chart illustrating an algorithm to authenticate the controller(s) and charge station of FIG. 1.

Referring to FIGS. 1 and 2, communications may be established with charge station(s) at operation 26. The controller(s) 22, for example, may establish communications with one or more of the charge stations 24 in the vicinity of the vehicle 10 as explained above. At operation 28, a trial charge pattern(s) may be established with the charge station(s). For example, the controller(s) 22, via the communication channels established at operation 26, may send instructions to the charge stations 24 to provide a specified power, voltage, and/or current (or some other desired profile) for a specified time period. In response, the charge stations 24 may send a confirmation of receipt along with timing information such that the controller(s) 22 and charge stations 24 agree on the start time of the trial charge pattern. At operation 30, the trial charge pattern(s) may be initiated. At the agreed upon start time, the charge stations 24 may begin providing the specified power, voltage, and/or current (or some other desired profile) for the specified time period. At operation 32, the parameter value(s) associated with the charge profile received from the charge station(s) are measured. For example, the controller(s) 22 may measure, detect, etc. the power, voltage, and/or current associated with the energy received. At operation 34, it is determined whether the measured parameter value(s) are equal to the agreed upon parameter value(s). For example, the controllers(s) 22 may determine whether the measured power, voltage, and/or current during the specified time period is approximately equal to the agreed upon values of the power, voltage and/or current for the trial charge pattern(s). If yes, normal battery charging is commenced at operation 36. The controller(s) 22, for example, may request that the charge station 24 provide some desired amount of power, energy, etc. to the battery charger 20 for charging of the traction battery 18. The algorithm then ends. If no, a notification is generated that the vehicle is not paired with the correct charge station at operation 38. For example, the controller(s) 22 may broadcast a message via the vehicle's car area network indicating that it is not correctly communicating with the charge station from which it is receiving energy. The controller(s) 22 may then prevent any further battery charging activities until this issue is resolved.

In other embodiments, if there is a discrepancy or uncertainty at operation 34, a new pattern may be selected and the process repeated. If a predetermined number of attempts fail, the controller(s) 22 may chose to notify other vehicle systems, the user, etc. of the discrepancy, choose to commence charging, or choose not to charge, etc.

Alternatively, the controller(s) 22 may request a series of specified power, voltage, and/or current values, such as voltage and current set point values, from the charge stations 24 instead of establishing a trial charge pattern. The controller(s) 22 may then determine whether the requested values are equal to the measured values. The controller(s) 22, in other arrangements, may request the charge stations 24 to send information regarding the power, voltage, and/or current values they are supplying. The controller(s) 22 may then determine whether the sent values are equal to the measured values.

Figure 3:
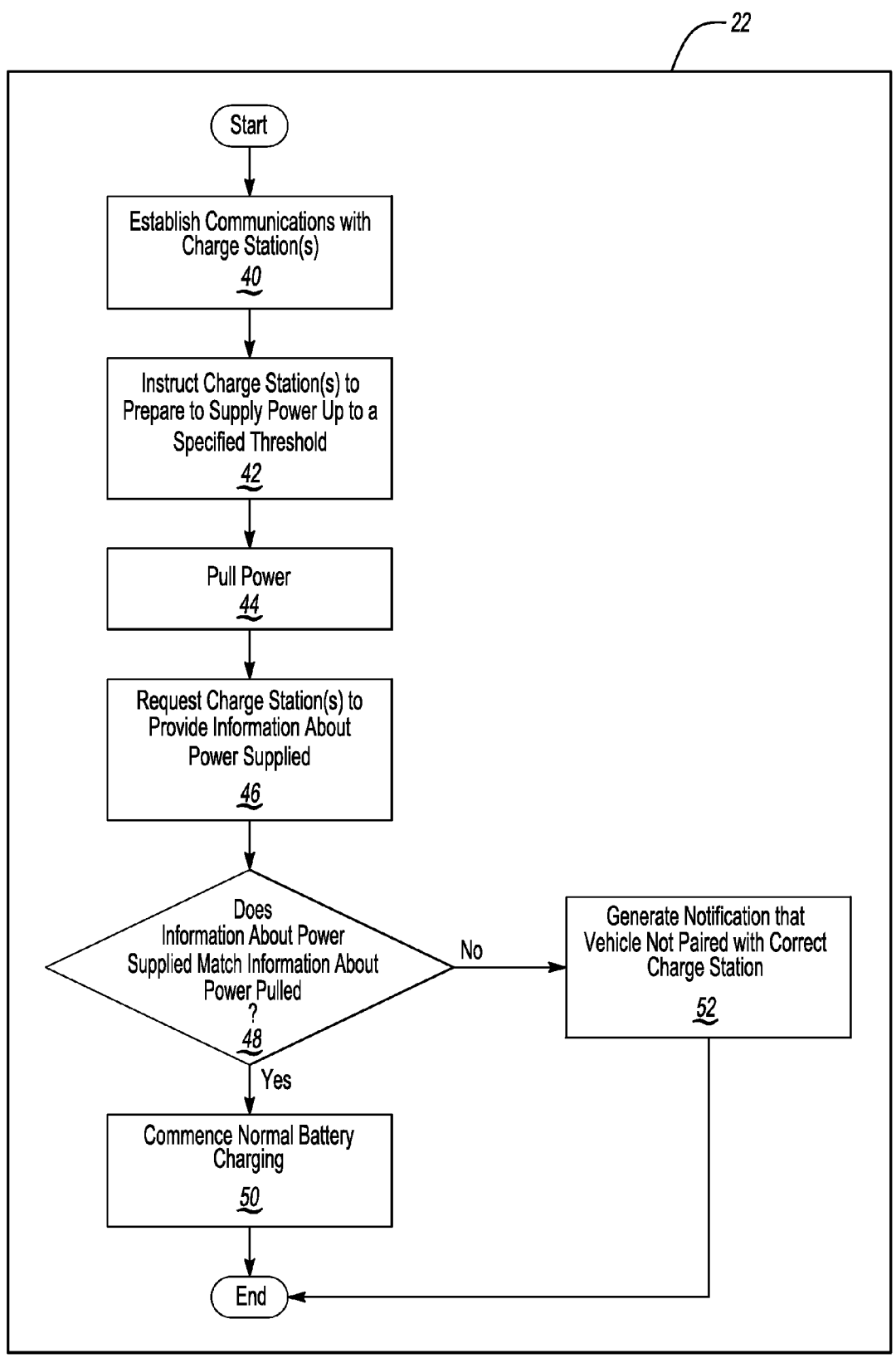
FIG. 3 is a flow chart illustrating another algorithm to authenticate the controller(s) and charge station of FIG. 1.

Referring to FIGS. 1 and 3, communications may be established with charge station(s) at operation 40. The controller(s) 22, for example, may establish communications with one or more of the charge stations 24 in the vicinity of the vehicle 10 as explained above. At operation 42, the charge station(s) may be instructed to prepare to supply power, current, etc. up to a specified threshold. The controller(s) 22, for example, may instruct the charge station 24 to prepare to supply up to 6 kW of power (at 120 V). At operation 44, power may be pulled from the charge station(s). For example, the controller(s) 22 may enable the battery charger 20 to pull power from the charge station 24 according to some random or predetermined schedule (e.g., 3 kW of power for 1 minute followed by 5 kW of power for 2 minutes, etc.) At operation 46, a request may be sent to the charge stations(s) to provide information about the power supplied. The controller(s) 22 for example, may request that the charge station 24 provide information describing the amounts and associated durations of the power supplied. At operation 48, it is determined whether the information about the power supplied approximately matches information about the power pulled. For example, the controller(s) 22 may determine whether the charge station 24 supplied 3 kW of power for 1 minute followed by 5 kW of power for 2 minutes, etc. If yes, normal battery charging is commenced at operation 50. The controller(s) 22, for example, may request that the charge station 24 provide some desired amount of current to the battery charger 20 for charging of the traction battery 18. The algorithm then ends. If no, a notification is generated that the vehicle is not paired with the correct charge station at operation 52. For example, the controller(s) 22 may broadcast a message via the vehicle's car area network indicating that it is not correctly communicating with the charge station from which it is receiving energy. The controller(s) 22 may then prevent any further battery charging activities until this issue is resolved.

The algorithms disclosed herein may be deliverable to/implemented by a processing device, such as the battery charger 20 or controller(s) 22, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A vehicle comprising:
   a traction battery;
   a battery charger configured to receive energy from a charge station remote from the vehicle and to provide energy to the battery; and
   one or more controllers configured to initiate charging of the battery and to notify the charge station if the power, voltage or current measured and reported by the charge station is not approximately equal to the power, voltage or current measured at the battery charger.

2. The vehicle of claim 1 wherein the one or more controllers are further configured to permit the battery charger to further receive energy from the charge station if the power, voltage or current measured and reported by the charge station is approximately equal to the power, voltage or current measured at the battery charger.

3. A method for authenticating a charge station comprising:
   establishing communications with the charge station;
   requesting that the charge station supply energy to a battery charger; and
   notifying the charge station in response to the power, voltage or current measured and reported by the charge station not being approximately equal to the power, voltage or current measured at the battery charger.

4. The method of claim 3 further comprising permitting the battery charger to further receive energy from the charge station if the power, voltage or current measured and reported by the charge station is approximately equal to the power, voltage or current measured at the battery charger.

5. A vehicle comprising:
a battery configured to receive, via a battery charger, energy from a charge station remote from the vehicle; and
a controller configured to initiate charging of the battery and to notify the charge station if an electrical parameter measured and reported by the charge station is not approximately equal to a same electrical parameter measured at the battery charger.

6. The vehicle of claim 5 wherein the controller is further configured to permit the battery to further receive energy if the electrical parameter measured and reported by the charge station is approximately equal to the same electrical parameter measured at the battery charger.

7. The vehicle of claim 5 wherein the electrical parameter is power.

8. The vehicle of claim 5 wherein the electrical parameter is voltage.

9. The vehicle of claim 5 wherein the electrical parameter is current.

10. A power system for an automotive vehicle comprising:
a battery; and
at least one controller configured to command a charge station to provide energy to the battery at a specified power, voltage, or current, and to notify the charge station if the power, voltage or current from the charge station measured at the battery is different than the specified power, voltage or current.

11. The system of claim 10 wherein the at least one controller is further configured to permit the charge station to continue to provide energy to the battery if the power, voltage or current from the charge station measured at the battery is not different than the specified power, voltage or current.

12. The system of claim 10 wherein the at least one controller is further configured to command the charge station to provide energy to the battery for a specified period of time.

13. The system of claim 12 wherein the at least one controller is further configured to request information from the charge station about the power, voltage or current from the charge station during the specified period of time.

* * * * *